United States Patent
Yao et al.

(10) Patent No.: US 11,907,843 B2
(45) Date of Patent: Feb. 20, 2024

(54) IMPORTANCE-AWARE MODEL PRUNING AND RE-TRAINING FOR EFFICIENT CONVOLUTIONAL NEURAL NETWORKS

(71) Applicant: Intel Corporation, Santa Clara, CA (US)

(72) Inventors: Anbang Yao, Beijing (CN); Yiwen Guo, Beijing (CN); Yurong Chen, Beijing (CN)

(73) Assignee: Intel Corporation, Santa Clara, CA (US)

(*) Notice: Subject to any disclaimer, the term of this patent is extended or adjusted under 35 U.S.C. 154(b) by 1436 days.

(21) Appl. No.: 16/305,626

(22) PCT Filed: Jun. 30, 2016

(86) PCT No.: PCT/CN2016/087859
§ 371 (c)(1),
(2) Date: Nov. 29, 2018

(87) PCT Pub. No.: WO2018/000309
PCT Pub. Date: Jan. 4, 2018

(65) Prior Publication Data
US 2020/0334537 A1    Oct. 22, 2020

(51) Int. Cl.
*G06N 3/082*    (2023.01)
*G06F 18/241*   (2023.01)
*G06V 10/764*   (2022.01)
*G06V 10/82*    (2022.01)

(52) U.S. Cl.
CPC .......... *G06N 3/082* (2013.01); *G06F 18/241* (2023.01); *G06V 10/764* (2022.01); *G06V 10/82* (2022.01)

(58) Field of Classification Search
CPC ............................ G06N 3/082; G06V 10/454
See application file for complete search history.

(56) References Cited

U.S. PATENT DOCUMENTS

2017/0337472 A1* 11/2017 Durdanovic ........... G06N 3/082

OTHER PUBLICATIONS

S. Paisitkriangkrai, C. Shen and A. van den Hengel, "Asymmetric Pruning for Learning Cascade Detectors," in IEEE Transactions on Multimedia, vol. 16, No. 5, pp. 1254-1267, Aug. 2014, doi: 10.1109/TMM.2014.2308723. (Year: 2014).*
Wikipedia, "Convolutional neural network", en.wikipedia.org/wiki/convolutional_neural_network, retrieved on May 2, 2016, 17 pages.
Wikipedia, "Lagrange multiplier", en.wikipedia.org/wiki/lagrange_multiplier, retrieved on May 2, 2016, 10 pages.
Lecun et al., "Gradient-based learning applied to document recognition", Proc. of the IEEE, Nov. 1998, 46 pages.
(Continued)

*Primary Examiner* — Ross Varndell
(74) *Attorney, Agent, or Firm* — Akona IP PC

(57) ABSTRACT

Systems, apparatuses and methods may provide for conducting an importance measurement of a plurality of parameters in a trained neural network and setting a subset of the plurality of parameters to zero based on the importance measurement. Additionally, the pruned neural network may be re-trained. In one example, conducting the importance measurement includes comparing two or more parameter values that contain covariance matrix information.

25 Claims, 4 Drawing Sheets

(56) References Cited

OTHER PUBLICATIONS

Krizhevsky et al., "ImageNet classification with deep convolutional neural networks", Advances in neural information processing systems, Jan. 2012, 9 pages.
Zhang et al., "Accelerating very deep convolutional networks for classification and detection", arxiv.org/pdf/1505.06798, Nov. 18, 2015, 14 pages.
Gong et al., "Compressing deep convolutional networks using vector quantization", arxiv.org/pdf/1412.6115, Dec. 18, 2014, 10 pages.
Chen et al., "Compressing convolutional neural networks", arxiv.org/pdf/1506.04449, Jun. 14, 2015, 9 pages.
Cheng et al., "An exploration of parameter redundancy in deep networks with circulant projections", arxiv.org/pdf/1502.03436, Oct. 27, 2015, 9 pages.
Jaderberg et al., "Speeding up convolutional neural networks with low rank expansions", arxiv.org/pdf/1405.3866, 2014, 13 pages.
Han et al., "Learning both weights and connections for efficient neural networks", arxiv.org/pdf/1506.02626, Oct. 30, 2015, 9 pages.
Han et al., "Deep compression: Compressing deep neural networks with pruning, trained quantization and Huffman coding", arxiv.org/pdf/1510.00149, Nov. 20, 2015, 13 pages.
Srinivas et al., "Data-free parameter pruning for deep neural networks", arxiv.org/pdf/1507.06149, Jul. 22, 2015, 12 pages.

\* cited by examiner

46

48

IMPORTANCE-AWARE MODEL PRUNING AND RE-TRAINING FOR EFFICIENT CONVOLUTIONAL NEURAL NETWORKS

CROSS REFERENCE TO RELATED APPLICATIONS

This application is a U.S. National Phase Patent Application which claims benefit to International Patent Application No. PCT/US2016/087859 filed on Jun. 30, 2016.

TECHNICAL FIELD

Embodiments generally relate to neural network-based machine learning. More particular, embodiments relate to importance-aware model pruning and re-training (IAMPR) with respect to efficient convolutional neural networks.

BACKGROUND

Machine learning may be useful in a variety of computer vision applications such as, for example, image classification, face recognition, generic object detection, and so forth. While convolutional neural networks (CNNs) may have improved machine learning accuracy, there remains considerable room for efficiency improvement. For example, many CNN architectures may be deep (e.g., containing many layers) and dense (e.g., containing many parameters), which may place a heavy burden on both memory and computational resources.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
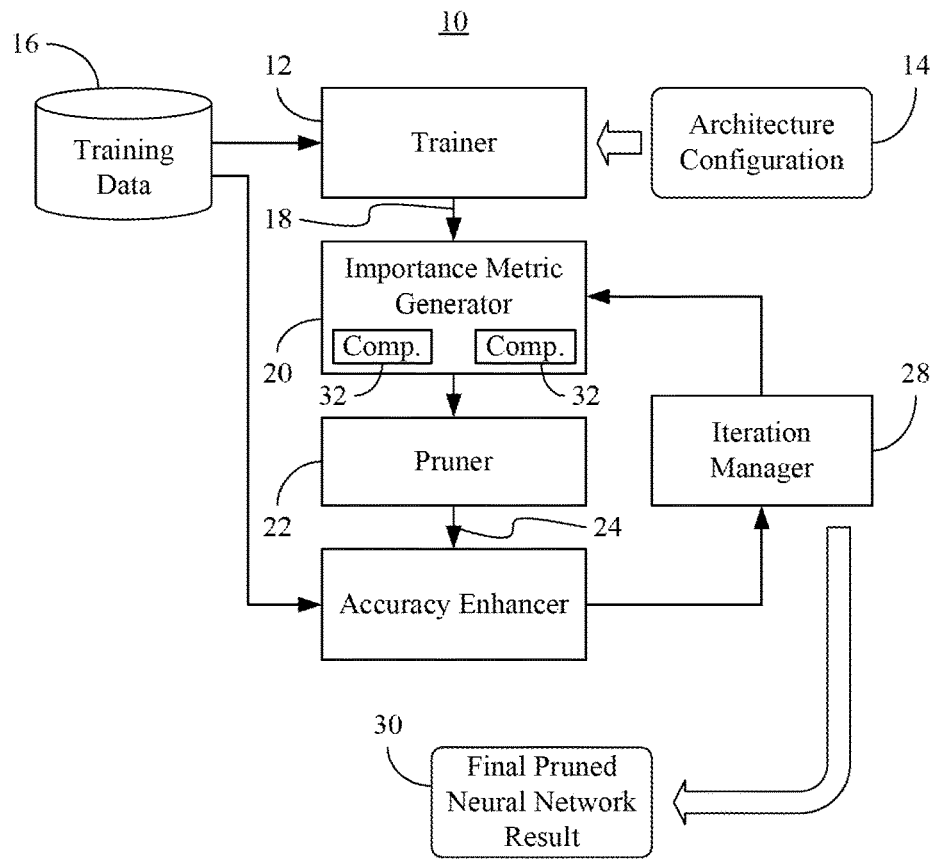
FIG. 1 is a block diagram of an example of a neural network enhancement apparatus according to an embodiment.

Turning now to FIG. 1, a neural network enhancement apparatus 10 is shown in which a trainer 12 receives configuration data 14 that describes the initial architecture configuration of a neural network such as, for example, a convolutional neural network (CNN). The configuration data 14 may specify the number of layers in the CNN as well as the parameter settings (e.g., convolutional kernel size, stride) and types of layers (e.g., convolutional layers, fully connected layers) in the CNN. The illustrated trainer 12 also receives training data 16 (e.g., from a training database), wherein the training data 16 may include known inputs and outputs for a particular application such as, for example, an image classification, face recognition and/or generic object detection application. The trainer 12 may use the configuration data 14 and the training data 16 to generate a trained neural network 18 (e.g., reference CNN model). The trained neural network 18 may be considered to be relatively dense to the extent that it contains a high number of parameters. The parameters of the trained neural network 18 may be the weights and biases of vectors describing various features (e.g., image classification features, face recognition features, object detect features) related to the application in question. Because certain features are typically more relevant than others, the parameters corresponding to less relevant features may be set to zero in order to reduce complexity, which may in turn save memory and computational resources, as well as reduce power consumption.

Accordingly, the apparatus 10 may include an importance metric generator 20 that conducts an importance measurement of the parameters in the trained neural network 18. Additionally, a pruner 22 may be communicatively coupled to the importance metric generator 20, wherein the pruner 22 sets a subset of the parameters to zero based on the importance measurement to obtain a pruned neural network 24. The subset may generally contain the parameters of lesser importance. The apparatus 10 may also include an accuracy enhancer 26 communicatively coupled to the pruner 22. The illustrated accuracy enhancer 26 uses the training data 16 to re-train the pruned neural network 24. In one example, the importance metric generator 20 iteratively conducts the importance measurement, the pruner 22 iteratively sets a subset of the parameters to zero and the accuracy enhancer 26 iteratively re-trains the pruned neural network 24 until an iteration manager 28 detects that the pruned neural network 24 satisfies a sparsity condition. Moreover, the importance metric generator 20, the pruner 22 and the accuracy enhancer 26 may maintain zero values of the subset on successive iterations. When the sparsity condition is satisfied, the illustrated iteration manager 28 generates a final result 30 (e.g., final pruned neural network result).

Theoretical Analysis

Mathematically, the apparatus 10 may prune the connections in a CNN model by setting most of the parameters (e.g., the weights and biases) to zero into a progressive layer-by-layer manner. For simplicity, a layer "C" (e.g., a convolutional or fully connected/FC layer) may be used as an example to demonstrate how to measure the importance of different parameters in the layer C and further remove less important parameters.

Given "p" feature maps as the input, the layer C first extracts all k×k×p local patches in the input (where k×k is the convolutional kernel size or $k^2$ is the length of the feature map feeding in a fully connected layer). In computer vision, the original data is usually an image. For a CNN model (e.g., classification model), however, the input of the first layer may simply be a cropped image region, wherein the feature map over this cropped image region may be referred to as the feature over a local patch. The layer C may then calculate the production of the local patches with "q" weight vectors and biases to get q feature maps as the output. If the input patches are flattened as vectors, above operation may be expressed as, $$y = W^T x + b, \qquad (1)$$

where $y \in R^q$, $b \in R^q$, $W \in R^{m \times q}$, $x \in R^m$, and $m = k^2 \times p$. For a compact representation, Eq. (1) may be rewritten as its augmented version $$y = M\tilde{x}, \qquad (2)$$

where $M=[W^T \; b]$ and $\hat{x}^T=[X^T 1]$. Now, a highly-sparse $\hat{M}$ may be used to replace M if $$M\hat{x}=\hat{M}\hat{x} \tag{3}$$

Because $\hat{M}$ may not be known in practice, the output y may be approximated with $\hat{M}$ and the given input $\hat{x}$. In other words, the following optimization problem may be solved for C $$\min_{\hat{M}} \frac{1}{2}\|y - \hat{M}\hat{x}\|_2^2 \text{ subj. to } \|\hat{M}\|_o < (m+1)\times q - t + 1, \tag{4}$$

where t is the number of zero parameters in $\hat{M}$. Eq. (4) is equivalent to $$\min_{\hat{M}} \frac{1}{2}\|(M - \hat{M})\hat{x}\|_2^2 \text{ subj. to}$$
$$(e_{u_1})^T \hat{M} e_{v_1} = 0, \ldots, (e_{u_t})^T \hat{M} e_{v_t} = 0, \tag{5}$$

where $e_{u_i}$ and $e_{v_j}$ are unit vectors whose lengths are the same as the lengths of the column and row vectors of $\hat{M}$, respectively. By using, for example, Lagrange undetermined multipliers, the optimization problem defined in Eq. (5) may be converted to the minimization of $$L(\hat{M},\alpha)=1/2\|(M-\hat{M})\hat{x}\|_2^2+\alpha((e_{u_1})^T\hat{M}e_{v_1}e_1^T+, \ldots, +(e_{v_1})^T\hat{M}e_{v_t}e_t^T) \tag{6}$$

Letting $$\frac{\partial L}{\partial \hat{M}} = 0 \text{ and } \frac{\partial L}{\partial \alpha} = 0 \tag{7}$$

enables the following equations to be obtained:

$$\hat{M}=M-(\alpha^T e_1)e_{u_1}(e_{v_1})^T+, \ldots, +(\alpha^T e_t)e_{u_t}(e_{v_t})^T)(\hat{x}\hat{x}^T)^{-1}, \tag{8}$$

and $$(e_{u_1})^T\hat{M}e_{v_1}e_1^T+, \ldots, +(e_{u_t})^T\hat{M}e_{v_1}e_1^T=0. \tag{9}$$

Substituting Eq. 8 into Eq. 9 provides:

$$\alpha = \left[\frac{M_{u_1 v_1}}{[(\hat{x}\hat{x}^T)^{-1}]_{u_1 v_1}} \cdots \frac{M_{u_t v_t}}{[(\hat{x}\hat{x}^T)^{-1}]_{u_t v_t}}\right]^T. \tag{10}$$

Accordingly, $$\hat{M} = M - \left(\frac{M_{u_1 v_1}}{[(\hat{x}\hat{x}^T)^{-1}]_{u_1 v_1}} e_{u_1}(e_{v_1})^T +, \right.$$
$$\left. \ldots, + \frac{M_{u_t v_t}}{[(\hat{x}\hat{x}^T)^{-1}]_{u_t v_t}} e_{u_t}(e_{v_t})^T\right)(\hat{x}\hat{x}^T)^{-1}, \tag{11}$$

And the following results:

$$L(\hat{M}, \alpha) = \frac{1}{2}\text{trace}\left((M - \hat{M})(\hat{x}\hat{x}^T)(M - \hat{M})^T\right) \tag{12}$$
$$= \frac{1}{2}\left(\frac{M_{u_1 v_1}^2}{[(\hat{x}\hat{x}^T)^{-1}]_{u_1 v_1}} + \ldots + \frac{M_{u_t v_t}^2}{[(\hat{x}\hat{x}^T)^{-1}]_{u_t v_t}}\right).$$

Where $[(\hat{x}\hat{x}^T)^{-1}]_{u_i v_j}$ is the entry element of the inverse of covariance matrix cov(X) over training samples X. According to Eq. 12, the smaller the value of $$\frac{M_{u_i v_j}^2}{[(\hat{x}\hat{x}^T)^{-1}]_{u_i v_j}}, \tag{13}$$

the lesser the importance of it. Therefore, for layer C, all values of the parameter expression (13) may be computed and sorted by M and cov(X). The sort may enable a determination of the indices of parameters that may be set to zero using an aggressive policy.

Of particular note is that setting $[(\hat{x}\hat{x}^T)_{-1}]_{u_i v_j}$ equal to the value one (e.g., as in certain conventional pruning approaches) may lead to unexpected error because independence among parameters cannot be assumed to be true. Accordingly, conventional pruning approaches may perform many re-training iterations in order to suppress accuracy losses resulting from the unexpected error. Rather, the apparatus 10 may explicitly take into consideration the covariance matrix values of the parameters (e.g., incorporating the influence of the inputs). As a result, the apparatus 10 may achieve greater accuracy and avoid performing a high number of re-training iterations in order to suppress possible accuracy losses resulting from the unexpected error. In this regard, the illustrated importance metric generator 20 includes one or more comparators 32 to compare parameter values that contain covariance matrix information. Indeed, prior to pruning, one or more parameters in the subset to be zeroed out (e.g., the less important parameters) may in fact be greater than one or more parameters that are not zeroed out (e.g., the more important parameters) due to the covariance impact on the parameter expression (13).

According to the above theoretical analysis, the importance measurement may be conducted on a per-layer basis and we can use layer-wise pruning to remove a portion of parameters in each layer directly. In order to prevent the error from the first layer from being accumulated by feed-forward processing, which may lead to a loss of accuracy of the regressed CNN model, re-training may be employed to augment the capability of the regressed model. By jointly performing the layer-wise regression and re-training in an iterative manner, highly-sparse CNN models may be constructed automatically and effectively. The apparatus 10 may therefore be considered an enhancement apparatus to the extent that the result 30 is highly sparse (e.g., contains much less parameters) and exhibits improved accuracy compared with the trained neural network 18 (i.e., originally dense neural network used as the reference model, e.g., reference CNN model).

The illustrated components of the apparatus 10 may each include fixed-functionality hardware logic, configurable logic, logic instructions, etc. Moreover, the apparatus 10 may be incorporated into a server, kiosk, desktop computer, notebook computer, smart tablet, convertible tablet, smart phone, personal digital assistant (PDA), mobile Internet device (MID), wearable device, media player, image capture device, etc., or any combination thereof.

Figure 2:
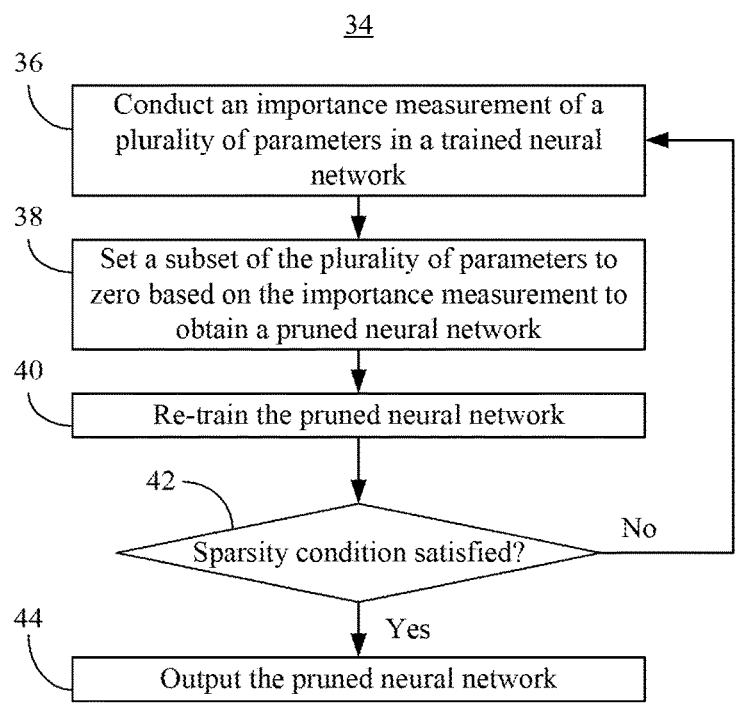
FIG. 2 is a flowchart of an example of a method of operating a neural network enhancement apparatus according to an embodiment.

FIG. 2 shows a method 34 of operating a neural network enhancement apparatus. The method 34 may generally be implemented in an apparatus such as, for example, the apparatus 10 (FIG. 1), already discussed. More particularly, the method 34 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 34 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 36 provides for conducting an importance measurement of a plurality of parameters in a trained neural network (e.g., CNN). As already noted, block 36 may include comparing two or more parameter values that contain covariance matrix information (e.g., over the inputs from training samples at each layer), wherein the compared parameter values may be defined by the parameter expression (13). A subset of the plurality of parameters may be set to zero at block 38 based on the importance measurement, wherein the result is a pruned neural network. When the trained neural network includes a plurality of layers, the importance measurement at block 36 may be conducted on a per-layer basis and block 38 may set the subset of parameters to zero on a per-layer basis. Moreover, Illustrated block 40 re-trains the pruned neural network, wherein a determination may be made at block 42 as to whether a sparsity condition is satisfied. The sparsity condition may specify, for example, the number or percentage of non-zero parameters in the neural network falling below a particular threshold. If the sparsity condition is not satisfied, the illustrated method 34 iteratively repeats blocks 36, 38 and 40. Once the sparsity condition is satisfied, block 44 may output the pruned neural network. Example pseudocode to conduct the model pruning and layer-wise regression is shown below.

Model Pruning Pseudocode

```
Input:
    Training image dataset S={img_1, ... , img_N}
    Originally-dense CNN architecture configuration A={layer_1, ... , layer_L}
    Target sparsity (i.e. zero) rate sr_t of the final CNN model
    The maximum number of re-trainings K
Main Procedure:
    Train an originally-dense CNN model cnn_s with A and S
    For k=1 to K
        For l=1 to L
            Perform layer-wise regression using the pseudocode in the following section (i.e. Layer-wise Regression Pseudocode)
        End
        Obtain a new CNN model cnn_k with sparsity rate sr_k
        Retraining cnn_k while keeping all zero parameters unchanged
        If sr_t<sr_k
            Break main loop, and set cnn_f=cnn_k
        Else
            Set cnn_f=cnn_k
        End
    End
Output:
    Final fully-sparse CNN model cnn_f
```

Layer-Wise Regression Pseudocode

```
Input:
    Input set of the current layer X={x_i}, x_i ∈ R^(m+1), i=1,2,...,N
    Original weight of the current layer M ∈ R^((m+1)×q)
    The number of expected pruned parameters t,
Procedure:
    Calculate the covariance matrix of input over training samples: cov(X)
    Calculate the loss matrix of using Eq. (12)
    For j=1 to t
        Find the parameter with the lowest pruning cost:
            [idx,idy] = minimal_element(Loss)
        Set its value to zero:
            M[idx,idy]=0
        Update the loss matrix:
            Loss[idx,idy]=Inf
            Loss[idx,:]=Loss[idx,:]+2(M[idx,idy]M[idx,:])⊕cov[idx,:],
    where ⊕ is Hadamard product
    End
Output:
    The new parameter matrix M = M.
```

Figure 3:
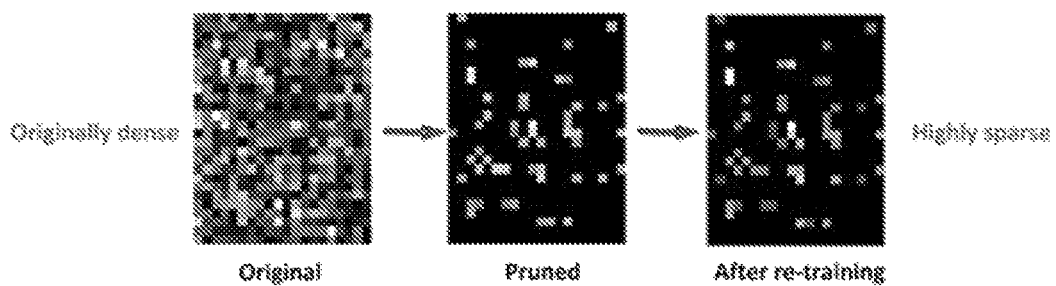
FIG. 3 is an illustration of an example of a convolutional layer in a CNN according to an embodiment.
Figure 4:
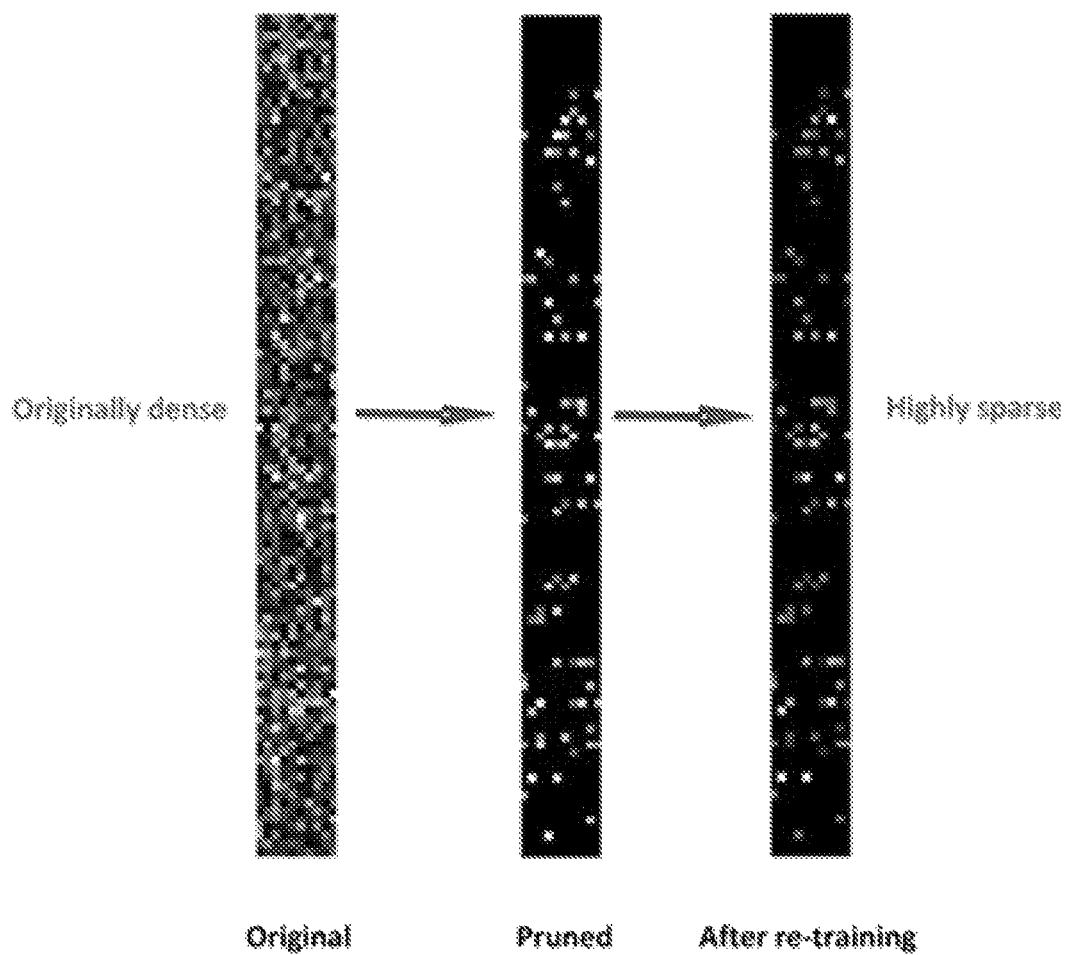
FIG. 4 is an illustration of an example of a fully connected layer in a CNN according to an embodiment.

FIG. 3 provides example results 46 for the first convolutional layer of "LeNet-5" (e.g., LeCun et al., 1998) to illustrate the IAMPR solution. The dark areas in the rightmost two illustrations represent the parameters with zero values. FIG. 4 shows example results 48 on the second FC layer of LeNet-5. The dark areas in the rightmost two illustrations represent the parameters with zero values. While portions of this disclosure may reference CNNs, other types of neural networks may also benefit from the techniques described herein.

Taking famous CNNs as test cases, the techniques described herein may yield substantially larger compression ratio with either improved accuracy or no accuracy loss compared with the originally dense reference model. Such a result may be a sharp difference compared with other model compression solutions, which typically lead to accuracy losses. For example, the number of floating-point operations remaining in the final model described herein may be linearly proportional to the sparsity rate (i.e., inverse of compression ratio). Thus, the energy cost may also be reduced significantly.

Figure 5:
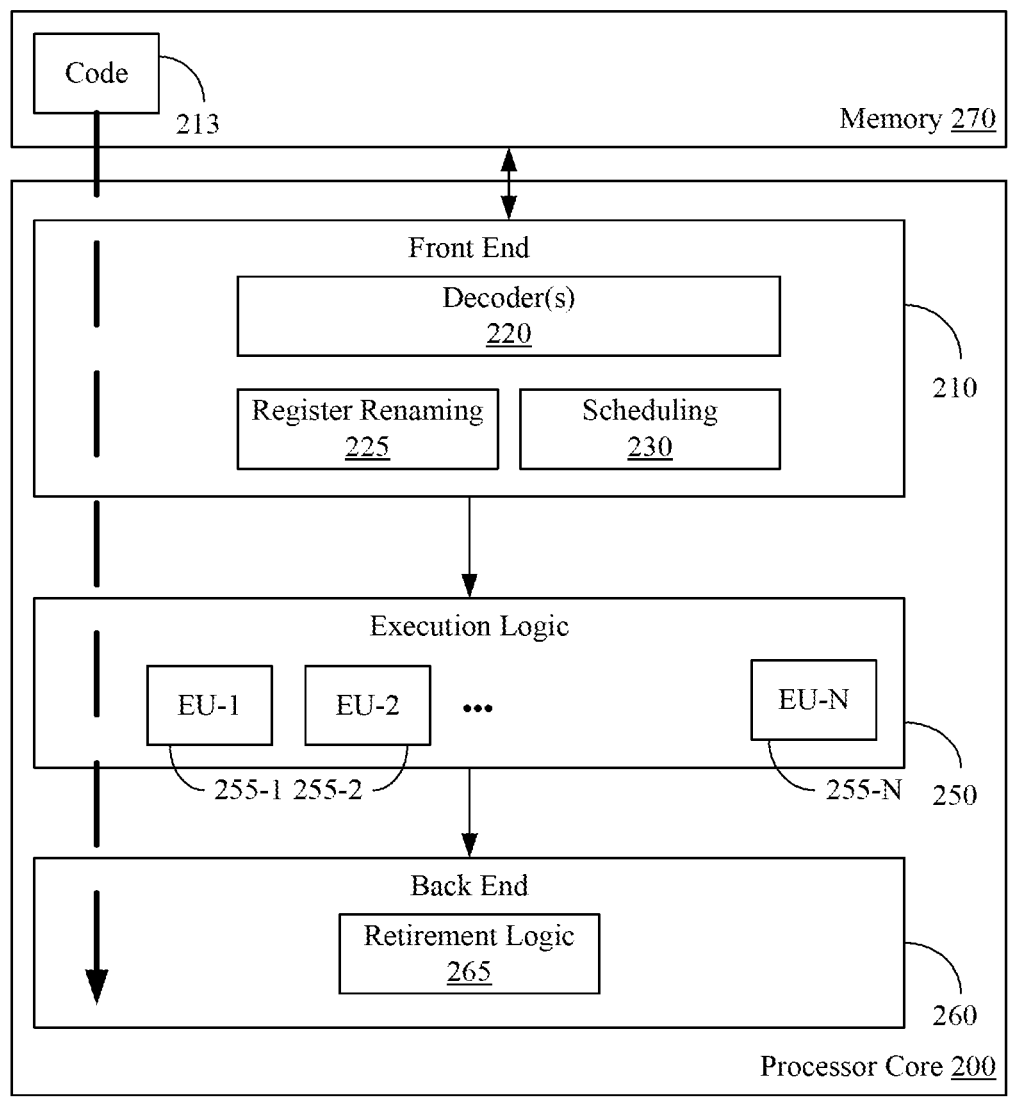
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 34 (FIG. 2), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
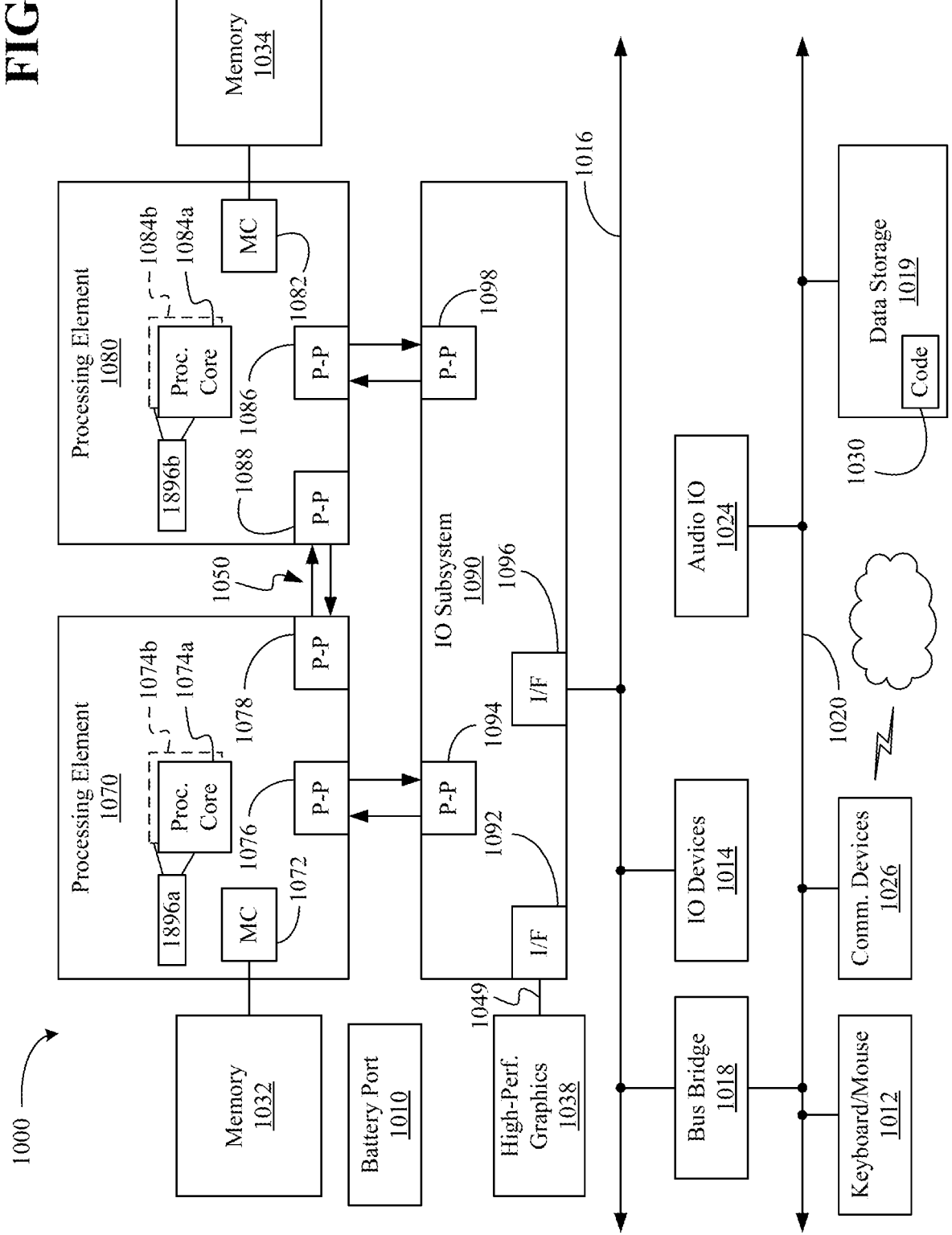
FIG. 6 is a block diagram of an example of a computing system according to an embodiment.

Referring now to FIG. 6, shown is a block diagram of a computing system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030, which may be similar to the code 213 (FIG. 5), may implement the method 34 (FIG. 2), already discussed. Further, an audio I/O 1024 may be coupled to second bus 1020 and a battery 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples

Example 1 may include a neural network enhancement apparatus comprising an importance metric generator to conduct an importance measurement of a plurality of parameters in a trained neural network, wherein the importance metric generator includes one or more comparators to compare two or more parameter values that contain covariance matrix information, a pruner communicatively coupled to the importance metric generator, the pruner to set a subset of the plurality of parameters to zero based on the importance measurement to obtain a pruned neural network, wherein one or more parameters in the subset is to be greater than one or more of the plurality of parameters that are not in the subset, an accuracy enhancer communicatively coupled to the pruner, the accuracy enhancer to re-train the pruned neural network, and an iteration manager, wherein the importance metric generator is to iteratively conduct the importance measurement, the pruner is to iteratively set the subset of the plurality of parameters to zero and the accuracy enhancer is to iteratively re-train the pruned neural network until the iteration manager detects that the pruned neural network satisfies a sparsity condition.

Example 2 may include the apparatus of Example 1, wherein the importance metric generator, the pruner and the accuracy enhancer are to maintain zero values of the subset on successive iterations.

Example 3 may include the apparatus of Example 1, wherein the trained neural network is to include a plurality of layers, the importance measurement is to be conducted on a per-layer basis and the subset of the plurality of parameters is to be set to zero on a per-layer basis.

Example 4 may include the apparatus of any one of Examples 1 to 3, wherein the trained neural network is to include a convolutional neural network.

Example 5 includes a neural network enhancement apparatus comprising an importance metric generator to conduct an importance measurement of a plurality of parameters in a trained neural network, a pruner communicatively coupled to the importance metric generator, the pruner to set a subset of the plurality of parameters to zero based on the importance measurement to obtain a pruned neural network and an accuracy enhancer communicatively coupled to the pruner, the accuracy enhancer to re-train the pruned neural network.

Example 6 may include the apparatus of Example 5, wherein the importance metric generator includes one or more comparators to compare two or more parameter values that contain covariance matrix information.

Example 7 may include the apparatus of Example 5, wherein one or more parameters in the subset is to be less than one or more of the plurality of parameters that are not in the subset.

Example 8 may include the apparatus of Example 5, further including an iteration manager, wherein the importance metric generator is to iteratively conduct the importance measurement, the pruner is to iteratively set the subset of the plurality of parameters to zero and the accuracy enhancer is to iteratively re-train the pruned neural network until the iteration manager detects that the pruned neural network satisfies a sparsity condition.

Example 9 may include the apparatus of Example 8, wherein the importance metric generator, the pruner and the accuracy enhancer are to maintain zero values of the subset on successive iterations.

Example 10 may include the apparatus of any one of Examples 5 to 9, wherein the trained neural network is to include a plurality of layers, the importance measurement is to be conducted on a per-layer basis and the subset of the plurality of parameters is to be set to zero on a per-layer basis.

Example 11 may include the apparatus of any one of Examples 5 to 9, wherein the trained neural network is to include a convolutional neural network.

Example 12 includes a method of operating a neural network enhancement apparatus, comprising conducting an importance measurement of a plurality of parameters in a trained neural network, setting a subset of the plurality of parameters to zero based on the importance measurement to obtain a pruned neural network and re-training the pruned neural network.

Example 13 may include the method of Example 12, wherein conducting the importance measurement includes comparing two or more parameter values that contain covariance matrix information.

Example 14 may include the method of Example 12, wherein one or more parameters in the subset is less than one or more of the plurality of parameters that are not in the subset.

Example 15 may include the method of Example 12, further including iteratively conducting the importance measurement, setting the subset of the plurality of parameters to zero and re-training the pruned neural network until the pruned neural network satisfies a sparsity condition, and outputting the pruned neural network in response to the sparsity condition being satisfied.

Example 16 may include the method of Example 15, further including maintaining zero values of the subset on successive iterations.

Example 17 may include the method of any one of Examples 12 to 16, wherein the trained neural network includes a plurality of layers, the importance measurement is conducted on a per-layer basis and the subset of the plurality of parameters is set to zero on a per-layer basis.

Example 18 may include the method of any one of Examples 12 to 16, wherein the trained neural network includes a convolutional neural network.

Example 19 includes at least one computer readable storage medium comprising a set of instruction, which when executed by a computing system, cause the computing system to conduct an importance measurement of a plurality of parameters in a trained neural network, set a subset of the plurality of parameters to zero based on the importance measurement to obtain a pruned neural network and re-train the pruned neural network.

Example 20 may include the at least one computer readable storage medium of Example 19, wherein the instructions, when executed, cause a computing device to compare two or more parameter values that contain covariance matrix information.

Example 21 may include the at least one computer readable storage medium of Example 19, wherein one or more parameters in the subset is to be less than one or more of the plurality of parameters that are not in the subset.

Example 22 may include the at least one computer readable storage medium of Example 19, wherein the instructions, when executed, cause a computing device to iteratively conduct the importance measurement, set the subset of the plurality of parameters to zero and re-train the pruned neural network until the pruned neural network satisfies a sparsity condition, and output the pruned neural network in response to the sparsity condition being satisfied.

Example 23 may include the at least one computer readable storage medium of Example 22, wherein the instructions, when executed, cause a computing device to maintain zero values of the subset on successive iterations.

Example 24 may include the at least one computer readable storage medium of any one of Examples 19 to 23, wherein the trained neural network is to include a plurality of layers, the importance measurement is to be conducted on a per-layer basis and the subset of the plurality of parameters is to be set to zero on a per-layer basis.

Example 25 may include the at least one computer readable storage medium of any one of Examples 19 to 23, wherein the trained neural network is to include a convolutional neural network.

Example 26 may include a neural network enhancement apparatus comprising means for conducting an importance measurement of a plurality of parameters in a trained neural network, means for setting a subset of the plurality of parameters to zero based on the importance measurement to obtain a pruned neural network, and means for re-training the pruned neural network.

Example 27 may include the apparatus of Example 26, wherein the means for conducting the importance measurement includes means for comparing two or more parameter values that contain covariance matrix information.

Example 28 may include the apparatus of Example 26, wherein one or more parameters in the subset is to be less than one or more of the plurality of parameters that are not in the subset.

Example 29 may include the apparatus of Example 26, further including means for iteratively conducting the importance measurement, setting the subset of the plurality of parameters to zero and re-training the pruned neural network until the pruned neural network satisfies a sparsity condition, and means for outputting the premed neural network in response to the sparsity condition being satisfied.

Example 30 may include the apparatus of Example 29, further including means for maintaining zero values of the subset on successive iterations.

Example 31 may include the apparatus of any one of Examples 26 to 30, wherein the trained neural network is to include a plurality of layers, the importance measurement is to be conducted on a per-layer basis and the subset of the plurality of parameters is to be set to zero on a per-layer basis.

Example 32 may include the apparatus of any one of Examples 26 to 30, wherein the trained neural network is to include a convolutional neural network.

Thus, techniques described herein may replace a well-trained and originally-dense CNN model from a related training dataset with a highly-sparse model. The techniques may leverage two phenomena in a unique fashion. First, a general CNN model may be composed of two kinds of layers, namely convolutional layers and fully connected (FC) layers. For these layers, the related mathematical operations between the input and weight parameters may always be dot products (including inner product), and the input of the next layer may be directly obtained from the output of the current layer. Accordingly, layer-wise regression (e.g., pruning less important parameters in each layer) may enable conversion of the originally-dense reference CNN model into a high-sparse model. Moreover, because layer-wise regression may introduce minor error that may be accumulated by feed forward processing, re-training may be used to augment the capability of the target model.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
   a memory; and
   hardware logic coupled to the memory, wherein the hardware logic is implemented in one or more of configurable logic or fixed-functionality logic hardware, the hardware logic coupled to the memory to:
   conduct an importance measurement of a plurality of parametric generators in a trained neural network with one or more comparators that compare two or more parameter values that contain covariance matrix information, wherein the covariance matrix information is to indicate that first values of an inverse covariance matrix are greater than second values of the inverse covariance matrix, wherein the first values correspond to a first subset of a plurality of parameters and the second values correspond to a second subset of the plurality of parameters;
   set the first subset of the plurality of parameters to zero and bypass a modification of the second subset of the plurality of parameters to zero based on the first values being greater than the second values to obtain a pruned neural network, wherein one or more parameters in the first subset is to be less than one or more of the second subset of the plurality of parameters;
   re-train the pruned neural network; and
   iteratively conduct the importance measurement, wherein the hardware logic coupled to the memory is to iteratively set the first subset of the plurality of parameters to zero and iteratively re-train the pruned neural network until the pruned neural network satisfies a sparsity condition.

2. The apparatus of claim 1, wherein the hardware logic is to maintain zero values of the first subset on successive iterations.

3. The apparatus of claim 1, wherein the trained neural network is to include a plurality of layers, the importance measurement is to be conducted on a per-layer basis and the first subset of the plurality of parameters is to be set to zero on a per-layer basis.

4. The apparatus of claim 1, wherein the trained neural network is to include a convolutional neural network.

5. An apparatus comprising:
   a processor; and
   a memory including a set of instructions, which when executed by the processor, causes the apparatus to:
   conduct an importance measurement of a plurality of parameters in a trained neural network based on covariance matrix information, wherein the covariance matrix information is to indicate that first values of an inverse covariance matrix are greater than second values of the inverse covariance matrix, wherein the first values correspond to a first subset of the plurality of parameters and the second values correspond to a second subset of the plurality of parameters;
   set the first subset of the plurality of parameters to zero and bypass a modification of the second subset of the plurality of parameters to zero based on the first values being greater than the second values to obtain a pruned neural network; and
   re-train the pruned neural network.

6. The apparatus of claim 5, wherein the apparatus includes one or more comparators to compare two or more parameter values that contain the covariance matrix information.

7. The apparatus of claim 5, wherein one or more of the first subset of the plurality of parameters is to be less than one or more of the second subset of the plurality of parameters.

8. The apparatus of claim 5, wherein the instructions, when executed, cause the apparatus to:
   iteratively conduct the importance measurement, and iteratively set the first subset of the plurality of parameters to zero and iteratively re-train the pruned neural network until the pruned neural network satisfies a sparsity condition.

9. The apparatus of claim 8, wherein the set of instructions, when executed, cause the apparatus to maintain zero values of the first subset on successive iterations.

10. The apparatus of claim 5, wherein the trained neural network is to include a plurality of layers, the importance measurement is to be conducted on a per-layer basis and the first subset of the plurality of parameters is to be set to zero on a per-layer basis.

11. The apparatus of claim 5, wherein the trained neural network is to include a convolutional neural network.

12. A method comprising:
    conducting an importance measurement of a plurality of parameters in a trained neural network based on covariance matrix information, wherein the covariance matrix information is to indicate that first values of an inverse covariance matrix are greater than second values of the inverse covariance matrix, wherein the first values correspond to a first subset of the plurality of parameters and the second values correspond to a second subset of the plurality of parameters;
    setting the first subset of the plurality of parameters to zero and bypassing a modification of the second subset of the plurality of parameters to zero based on the first values being greater than the second values to obtain a pruned neural network; and
    re-training the pruned neural network.

13. The method of claim 12, wherein conducting the importance measurement includes comparing two or more parameter values that contain the covariance matrix information.

14. The method of claim 12, wherein one or more of the first subset of the plurality of parameters is less than one or more of the second subset of the plurality of parameters.

15. The method of claim 12, further including:
    iteratively conducting the importance measurement, setting the first subset of the plurality of parameters to zero and re-training the pruned neural network until the pruned neural network satisfies a sparsity condition; and outputting the pruned neural network in response to the sparsity condition being satisfied.

16. The method of claim 15, further including maintaining zero values of the first subset on successive iterations.

17. The method of claim 12, wherein the trained neural network includes a plurality of layers, the importance measurement is conducted on a per-layer basis and the first subset of the plurality of parameters is set to zero on a per-layer basis.

18. The method of claim 12, wherein the trained neural network includes a convolutional neural network.

19. At least one non-transitory computer readable storage medium comprising a set of instructions, which when executed by a computing system, cause the computing system to:

conduct an importance measurement of a plurality of parameters in a trained neural network based on covariance matrix information, wherein the covariance matrix information is to indicate that first values of an inverse covariance matrix are greater than second values of the inverse covariance matrix, wherein the first values correspond to a first subset of the plurality of parameters and the second values correspond to a second subset of the plurality of parameters;

set the first subset of the plurality of parameters to zero and bypass a modification of the second subset of the plurality of parameters to zero based on the first values being greater than the second values to obtain a pruned neural network; and re-train the pruned neural network.

20. The at least one non-transitory computer readable storage medium of claim 19, wherein the instructions, when executed, cause a computing device to compare two or more parameter values that contain the covariance matrix information.

21. The at least one non-transitory computer readable storage medium of claim 19, wherein one or more of the first subset of the plurality of parameters is to be less than one or more of the second subset of the plurality of parameters.

22. The at least one non-transitory computer readable storage medium of claim 19, wherein the instructions, when executed, cause a computing device to:

iteratively conduct the importance measurement, set the first subset of the plurality of parameters to zero and re-train the pruned neural network until the pruned neural network satisfies a sparsity condition; and output the pruned neural network in response to the sparsity condition being satisfied.

23. The at least one non-transitory computer readable storage medium of claim 22, wherein the instructions, when executed, cause a computing device to maintain zero values of the first subset on successive iterations.

24. The at least one non-transitory computer readable storage medium of claim 19, wherein the trained neural network is to include a plurality of layers, the importance measurement is to be conducted on a per-layer basis and the first subset of the plurality of parameters is to be set to zero on a per-layer basis.

25. The at least one non-transitory computer readable storage medium of claim 19, wherein the trained neural network is to include a convolutional neural network.

* * * * *

UNITED STATES PATENT AND TRADEMARK OFFICE
CERTIFICATE OF CORRECTION

PATENT NO. : 11,907,843 B2
APPLICATION NO. : 16/305626
DATED : February 20, 2024
INVENTOR(S) : Anbang Yao et al.

It is certified that error appears in the above-identified patent and that said Letters Patent is hereby corrected as shown below:

In the Claims

In Column 14, Claim 8, Line 25, delete "instructions," and insert -- set of instructions, --, therefor.

In Column 16, Claim 20, Line 2, delete "instructions," and insert -- set of instructions, --, therefor.

In Column 16, Claim 22, Line 11, delete "instructions," and insert -- set of instructions, --, therefor.

In Column 16, Claim 23, Line 20, delete "instructions," and insert -- set of instructions, --, therefor.

Signed and Sealed this
Twenty-sixth Day of March, 2024

Katherine Kelly Vidal
*Director of the United States Patent and Trademark Office*